United States Patent [19]

Larson

[11] Patent Number: 4,548,171

[45] Date of Patent: Oct. 22, 1985

[54] ROTARY ENGINE

[76] Inventor: Theodore G. Larson, 828 1st St. North, Sartell, Minn. 56377

[21] Appl. No.: 631,906

[22] Filed: Jul. 18, 1984

Related U.S. Application Data

[63] Continuation-in-part of Ser. No. 540,312, Oct. 11, 1983, abandoned.

[51] Int. Cl.$^4$ ............................................. F02B 53/06
[52] U.S. Cl. ..................................... 123/230; 418/112
[58] Field of Search ................. 123/230, 231; 418/112

[56] References Cited

U.S. PATENT DOCUMENTS

| 891,394 | 6/1908 | Benson | 123/230 |
|---|---|---|---|
| 2,402,257 | 6/1946 | Rich | 123/230 |
| 2,829,603 | 4/1958 | Clark | 418/112 |
| 3,572,030 | 3/1971 | Cuff | 123/231 |
| 3,823,694 | 7/1974 | Mazzagatti | 123/230 |

FOREIGN PATENT DOCUMENTS

| 2448828 | 4/1976 | Fed. Rep. of Germany | 123/230 |
|---|---|---|---|
| 2601551 | 7/1977 | Fed. Rep. of Germany | 123/230 |
| 905226 | 4/1945 | France | 123/230 |
| 76477 | 3/1950 | Norway | 123/230 |
| 19252 | of 1914 | United Kingdom | 123/230 |

Primary Examiner—Michael Koczo
Attorney, Agent, or Firm—Robert C. Baker

[57] ABSTRACT

The rotary engine has a circumferential main chamber and at least one smaller combustion chamber spaced from the main chamber. The rotor includes a plurality of radially-projecting sealing members in spaced relationship thereabout for maintaining a fluid-sealed condition along a single fixed transverse strip area on the interior surface of the main chamber. A single radially-oriented axially-parallel piston vane is also carried by the rotor and moves through the fixed strip area of the main chamber at each revolution of the rotor. Plural passages for intake, compression, expansion, and exhaust are ported into the main chamber at locations proximate to the fixed strip area. Valve means in the passages selectively open and close the same for a cycle of engine operation involving intake, compression, burning, and exhaust.

16 Claims, 7 Drawing Figures

ROTARY ENGINE

CROSS REFERENCE TO RELATED APPLICATION

This is a continuation-in-part of my application Ser. No. 540,312, filed Oct. 11, 1983, now abandoned.

BACKGROUND OF THE INVENTION

This invention relates to a rotary engine, and more particularly to a rotary engine having at least one combustion chamber entirely separate from a main chamber in which a rotor equipped with a piston vane operates.

Rotary engines possess several advantages over those of the reciprocating piston type. Not only is the crankshaft unnecessary in rotary engines, but in engines of about equal size, the "piston" power leverage on the drive shaft of a rotary engine is greater than that in the reciprocating type.

Especially significant with respect to the rotary engine of this invention is the fact that the external or special combustion chamber, or pair of combustion chambers, contribute to the achievement of complete burning of a combustible mixture, with efficient utilization of the power thereby created, before burned products are exhausted into the atmosphere.

While rotary engines have heretofore been proposed, and external or separate combustion chambers have also heretofore been proposed for engines, no engine heretofore proposed is known to possess the high reliability and efficiency and smoothness of operation provided by the teachings of this invention.

SUMMARY OF THE INVENTION

The present invention relates to an improved rotary engine wherein the housing has a circumferential main chamber and at least one discrete and smaller combustion chamber spaced apart from the main chamber. The main chamber is defined by opposing side surfaces (walls) and by an endless circumferential surface (wall) bridging between the side surfaces and lying concentric to (and defining) the axis of the main chamber. Preferably, at least two discrete and smaller combustion chambers are incorporated in the rotary engine hereof. Within the main chamber is a rotor having a fixed axis of rotation parallel to but spaced from the axis of the main chamber. A rotatable drive shaft is mounted in the housing at the axis of the rotor and is rotated by the rotor. Plural passage means are provided for communication between the combustion chamber or chambers and the main chamber, as well as for intake of combustion supporting fluid into and exhaust of burned fluid from the main chamber. Valve means are disposed in the passage means for selectively opening and closing communication of the passages of the passage means with the main chamber so as to effect a cycle of operation of the engine which, in the case of one combustion chamber, may consist of three complete revolutions of the rotor, and in the case of two combustion chambers may consist of a total of four complete revolutions of the rotor.

Especially significant is the fact that the rotor itself includes a plurality of radially-projecting sealing members in spaced relationship thereabout for maintaining the rotor at all times during rotation thereof in a fluid-sealed condition with respect to the circumferential surface of the main chamber. This fluid-sealed condition is maintained at all times along a single fixed transverse strip area across the circumferential surface of the main chamber. Further, the rotor has a single radially-oriented axially-parallel piston vane recessible within the rotor and biased during rotation of the rotor to extend radially-outward, to thereby maintain the radially-outward end of the piston vane at all times in pressing contact relationship with the circumferential surface of the main chamber during rotation of the rotor. The piston vane is moved through the fixed strip area on the circumferential surface of the main chamber at each revolution of the rotor.

Conveniently, the passage means for communication between the combustion chamber or chambers and the main chamber as well as for intake of combustion supporting fluid and exhaust of burned fluid from the main chamber are all entirely within the housing as distinguished from the rotor.

The arrangement of the elements and the functional features permit the engine to be formed in extremely small size while providing substantial power output on a drive shaft. Compactness is further achieved by employing preferred rotary valve members having plural valve conduits. Advantageously, the moving parts of the preferred engine are rotating parts; and the direction of rotation is constant during operation.

While cylindrical circumferential surfaces for the main chamber are quite useful, especially beneficial results in terms of ring-type sealing are possible by employing a main chamber circumferential surface which is transversely curved.

Still other advantages and features of the engine will be evident as this description proceeds.

DESCRIPTION OF THE PREFERRED EMBODIMENT

Figure 1:
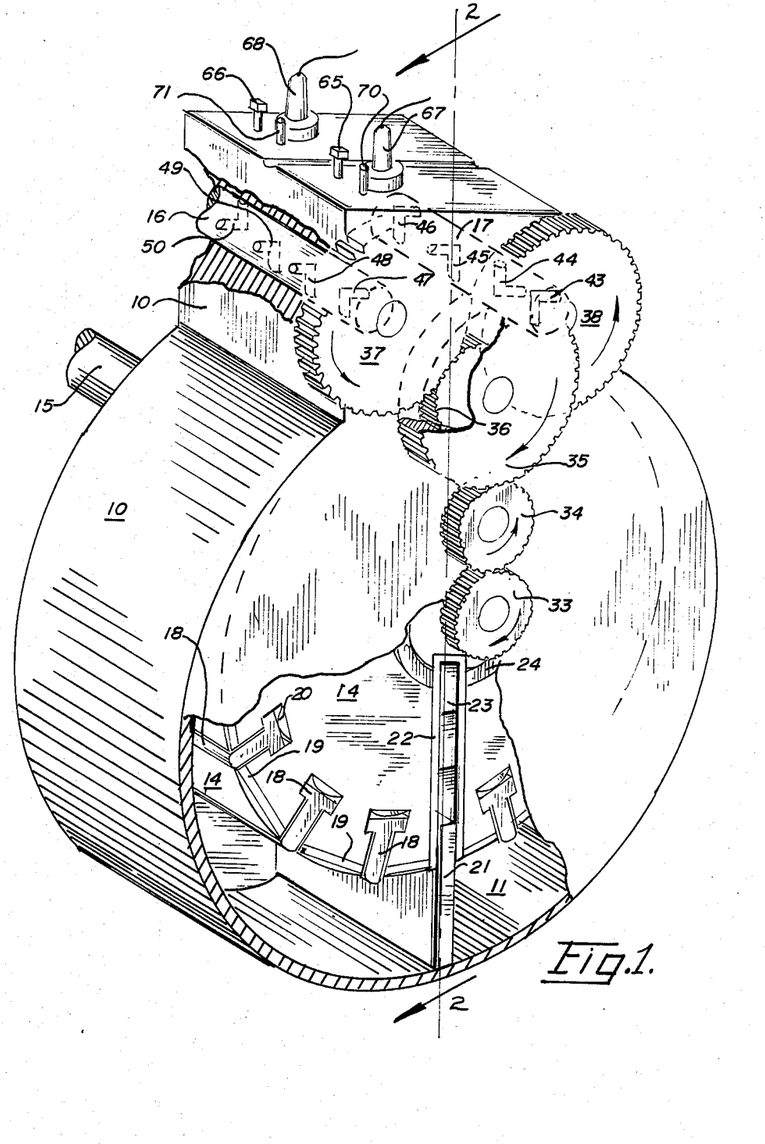
FIG. 1 is a schematic perspective view of one embodiment for the engine, with parts broken away to graphically illustrate internal features of structure.
Figure 2:
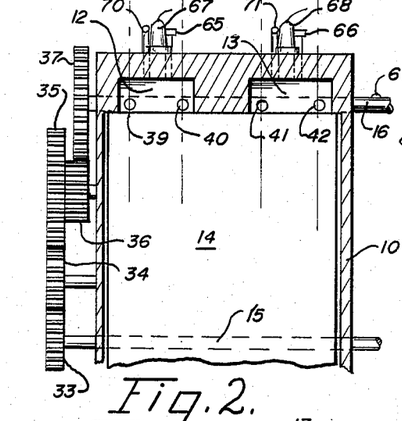
FIG. 2 is a schematic cross-sectional view, partially broken away, taken on line 2—2 of FIG. 1.

Referring particularly to FIGS. 1 and 2, the engine comprises an overall housing 10 which may be looked upon as a casing for the operating parts of the engine. The housing 10 has an interior circumferential main chamber 11 (here illustrated as one which is cylindrical) and two combustion chambers 12 and 13 (see FIG. 2). For convenience, housing 10 has been illustrated as a single solid structure, although those skilled in the art will readily recognize that the housing 10 suitably would be made up of different parts appropriately gasketed and bolted together as is well known.

Within the housing is a rotor 14 which is here illustrated as having a cylindrical outermost surface, that is one having an outer transverse contour similar to the transverse contour of the circumferential surface of the main chamber. Thus, in this embodiment, both are cylindrical. The rotor 14 has its axis of rotation parallel to but spaced from the axis of the cylindrical main chamber. A rotatable drive shaft 15 is mounted in the housing at the axis of the rotor and suitably splined to the rotor so as to be rotated by the rotor. Details of the passage means within the housing are best covered in connection with discussion of operative characteristics of the engine. At this point in referring to FIG. 1, attention is called to two valve members in the nature of rotatable shafts 16 and 17. These rotatable shafts 16 and 17 are disposed in the passage means to be hereinafter discussed.

Importantly, the rotor is equipped with a plurality of radially-projecting transversely elongated sealing members 18; and in this embodiment they suitably are in the nature of T-bars. These T-bar seals are comparable in function to the seal provided by piston rings in reciprocating engines. The T-bar seals are mounted in the rotor with the cross member of the T lodged within a recess of the rotor, and the stem or leg of the T projects radially-outward through a passage and terminates with but slight projection beyond the circumferential peripheral surface of the main body of the rotor, for reasons to be hereinafter evident. Observe, however, that the recesses for the cross member of the T configuration retain the T-bar seals against being forced completely out of their peripheral locations in spaced relationship about the rotor. Further provided are side or lateral sealing bars 19 suitably lodged in substantially mating side or lateral recesses of the rotor at circumferentially outward locations and extending between stem or leg members of the T-bar seals. Both the T-bar seal 18 and the side bar seals 19 suitably may be biased to push outwardly from the body of the rotor by a leaf spring, as illustrated at 20 for the T-bar seals. To be recognized is that the side bar seals 19 press against the flat ends or side walls of the cylindrical main chamber of the housing 10 during rotation of the rotor.

Also part of the rotor assembly is a piston vane 21. This piston vane 21 is a single radially-oriented axially-parallel vane. It is recessible within the rotor and biased in or during rotation of the rotor toward a radially-outward condition. A leaf spring 23, suitably a double leaf spring, may be employed to effect such biasing; but biasing of the piston vane as well as the T-bar seals in a radially-outward direction may be accomplished during rotation simply by the centrifugal force of rotation, thereby rendering leaf springs or other means for biasing unnecessary but advantageous to employ to enhance the starting capabilities of the engine. The piston vane 21 suitably is mounted within a U-seal structure lodged into the body of the rotor, as illustrated. Such a mounting accommodates the radial shift or extension and retraction of the piston with respect to the body of the rotor during engine operation. One should recognize, however, that the path of movement of the distal end of the piston vane during engine operation is basically that of a true circle within the main chamber, with the rotor body providing a recess for the piston vane to shift radially within.

An oil seal 24 in the nature of an O-ring may be employed at each flat end face of the rotor for pressing against the flat inner surface of the end members or side walls of the housing. Any suitable means may be employed to provide lubricated mountings for the drive shaft in the housing; and those mountings may incorporate roller bearings and the like as is well known. Further, oiling of the rotor piston vane and seal structures for smooth operation within the housing as well as oiling of valve shafts 16 and 17 may be accomplished in any suitable manner. Illustratively, oil may be forced under pressure through small passages of the rotor for distribution in a manner to effect smooth internal operation. It may be admixed with the fuel. Cooling of the engine may be accomplished by adding fins to the housing or by circulating a coolant through a jacket added on the exterior of the illustrated housing. Such features are well known to those skilled in the art.

Figure 3:
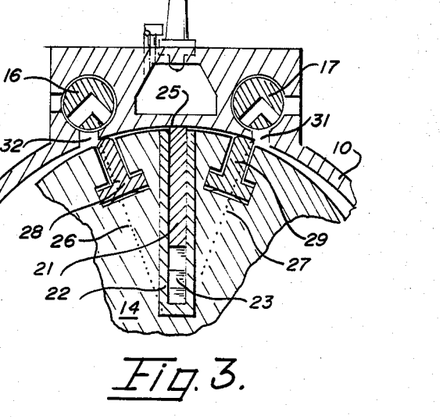
FIG. 3 is a schematic cross-sectional view, partially broken away, taken along the line or level W in FIG. 2, but with the piston vane of the rotor shown in the neutral or upper position opposite to that illustrated in FIG. 1 and with features of the valve structures oriented consistent with the illustrated neutral position of the piston vane.
Figure 4:
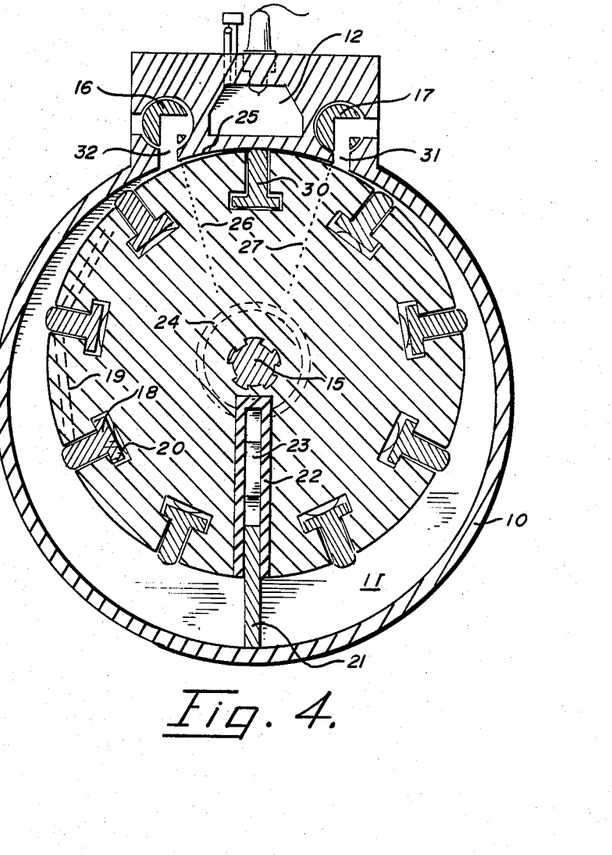
FIG. 4 is a schematic cross-sectional view taken along the line or level W in FIG. 2, and particularly illustrates the position of elements at the midpoint of the primary or first revolution of the rotor in a cycle of operation of the engine.

Reference is now made to FIGS. 3 and 4 for the purpose of describing a feature of the invention characterized as a single fixed transverse (i.e., oriented in the axial direction) strip area on and extending across the interior circumferential surface of the main chamber. In the embodiment of these Figures, that strip area is axially parallel and lies on the interior of the cylindrical surface of the main chamber. It should be observed that the outer cylindrical or circumferentially peripheral surface of the rotor is in substantial tangential relationship with the interior cylindrical surface of the main chamber along a fixed axially-parallel strip area 25 on the interior surface of the main chamber. The strip area itself is arced in the circumferential direction, and lies on the interior cylindrical surface of the main chamber at a location between the dot lines 26 and 27 in FIGS. 3 and 4. It is within this limited arced or arcuate area that the T-bars, generally characterized by numeral 18, and specifically illustrated in FIG. 3 as T-bars 28 and 29, effectively maintain a substantially fluid sealed condition at all times. Illustratively, the T-bars 28 and 29 in FIG. 3 are in pressing engagement with the strip area 25 at locations between dot lines 26 and 27 (see FIGS. 3 and 4). This seal by the T-bars against the strip area 25 is preferably maintained even when the piston vane 21 is at the neutral position illustrated in FIG. 3. But in Figure 4, with the piston vane 21 at its midpoint, that is where it is maximumly extended and located opposite the neutral position illustrated in FIG. 3, a single T-bar 30 effectively maintains the fluid-sealed condition at the strip area 25. Thus it is that the sealing members in the nature of T-bars located in spaced relationship about the rotor serve to maintain the rotor at all times during rotation thereof in a fluid-sealed condition with respect to the interior cylindrical surface of the main chamber along this single fixed axially-parallel or axially oriented strip area 25 on the interior surface of the main chamber. Further to be noted is that there is no packing or other shiftable sealing material projecting radially inward from the cylindrical surface of the main chamber.

The radially-outward end of the piston vane 21 is constantly maintained in pressing contact relationship with the interior cylindrical surface of the main chamber during rotation of the rotor. The piston vane is moved through the fixed strip area 25 of the main chamber at each revolution of the rotor.

Before leaving FIG. 4, attention is called to the relationship of the intake port 31 into the main chamber 11 as well as the exhaust port 32 from the main chamber. Both are located proximate to the fixed strip area 25. In fact all porting into the main chamber is located proximate (that is, near or even adjacent) to the fixed strip area 25, as hereinafter will further be evident.

Refer now to FIGS. 1 and 2 for a description of the timing means employed for operation of the valve shafts 16 and 17. A tooth gear 33 is suitably mounted on the exposed outer end of the drive shaft 15 opposite that end from which any suitable power takeoff elements are mounted. Meshing with the teeth of gear 33 is an idler gear 34 of the same diameter as gear 33. A larger idler gear 35, illustratively with a circumference twice that of the idler gears 34 and 33, is rotated by the gear 34 and simultaneously effects rotation of the tooth gear 36 fixed to gear 35. Note that gear 36 is illustrated to have the same diameter as gears 33 and 34. From the tooth gear 36, the valve shaft mounted gears 37 and 38, of diameter and therefore circumference the same as gear 35, effectively are rotated and in turn rotate with them the valve shafts 16 and 17. Thus, for clockwise rotation of the drive shaft 15 and gear 33 as illustrated in FIG. 1, power is transmitted through the gears 34, 35, 36, 37 and 38 to the valve shafts 16 and 17 and effectively rotates the valve shafts 16 and 17 in a counterclockwise direction as illustrated in FIG. 1.

Further, the gear diameters are such that the valve shafts 16 and 17 are rotated only one quarter of a revolution for each full revolution of the rotor.

Before discussing the specific valve conduits in the shafts 16 and 17 illustrated in FIG. 1, reference is made to FIG. 2 for the purpose of explaining the relative position of each of the four valve conduits through the valve shafts. Specifically, at the level W of each valve shaft is a valve conduit position labeled 39 in FIG. 2 for schematic purposes. Comparably, at levels X, Y and Z are valve conduit positions labeled 40, 41 and 42, respectively, in FIG. 2.

Referring now to FIG. 1, the illustrated relative orientation of each of the four L-shaped valve conduits through the shaft valves 16 and 17 is that for the primary revolution of the rotor 14 in a cycle of engine operation consisting of four revolutions. Thus, at the level W (to be gleaned from FIG. 2), valve shaft 17 has a valve conduit 43 and valve shaft 16 has a valve conduit 47 (i.e., at position 39 in FIG. 2). At the level X, valve shaft 17 has the valve conduit 44 and valve shaft 16 has the valve conduit 48 (i.e., at position 40 in FIG. 2). At the level Y, valve shaft 17 has the valve conduit 45 and valve shaft 16 has the valve conduit 49 (i.e., at position 41 in FIG. 2). And finally at the level Z, valve shaft 17 has the valve conduit 46 and valve shaft 16 has the valve conduit 50 (i.e., at position 42 in FIG. 2). These numbers for the L-shaped valve conduits through the shaft valves 16 and 17 in FIG. 1 are consistently hereafter employed in the several vignettes of FIG. 5, to be now discussed.

Figure 5:
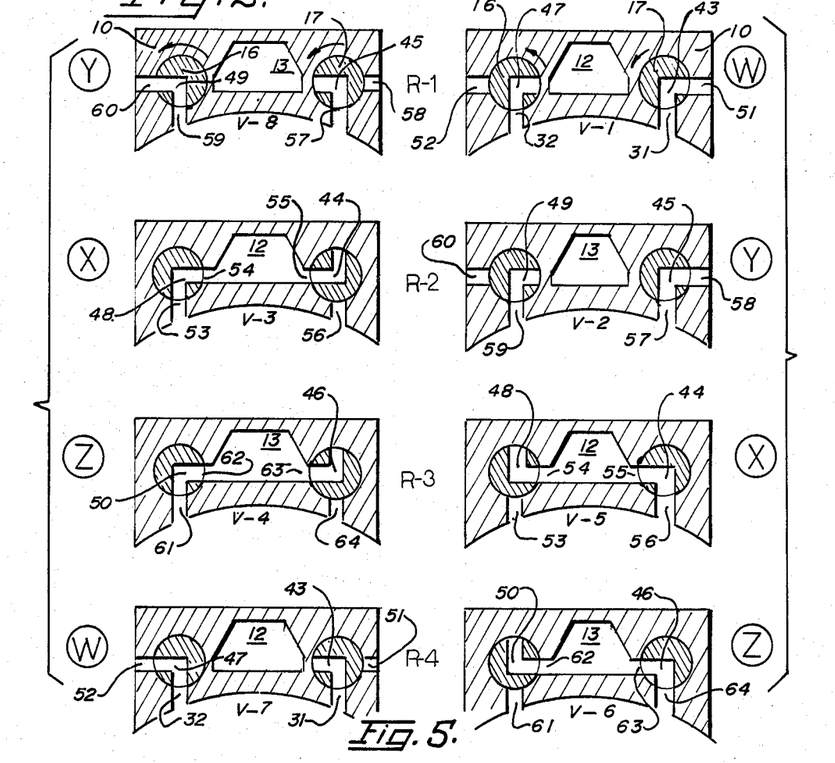
FIG. 5 is a schematic representation in the form of a chart of vignettes of valve positions at the midpoint of rotor revolution (as illustrated in Figures 1 and 4) in the cycle of operation of the preferred engines of the invention where two combustion chambers are present, the cycle being that of four revolutions of the rotor, and the vignettes being through levels W, X, Y, or Z of FIG. 2, as those levels are likewise labeled in FIG. 5; the vignettes are positioned in two columns, with those in the left column showing valve positions dealing with fluid gases in front of and therefore pushed by the piston vane, and those in the right column dealing with fluid gases behind the piston vane.

While FIG. 5 omits any schematic showing of the rotor and its piston vane 21, the vignettes of FIG. 5 must be looked upon and understood with the recognition that the piston vane is at the location illustrated in FIG. 4, namely at midpoint of a revolution clockwise from neutral. The vignettes in the left column, namely those labeled V-8, V-3, V-4, and V-7, illustrate the L-shaped valve conduit positions effectively controlling the flow of fluid gases being pushed from the main chamber ahead of the piston vane during clockwise rotation of the rotor (as viewed in FIGS. 1 and 4). The vignettes in the right column, those labeled V-1, V-2, V-5, and V-6, show L-shaped valve conduit positions for fluid gases entering the main chamber behind the piston vane. Still further, all vignettes of odd number, namely those labeled V-1, V-3, V-5 and V-7, show L-shaped valve conduit positions at the W and X levels which deal with flow of fluid gases in or out of the main chamber as pertinent to the operation of one of the external combustion chambers, namely external combustion chamber 12 for illustration purposes. Similarly, the vignettes of even number, namely V-2, V-4, V-6 and V-8, illustrate valve positions at the Y and Z levels for controlling the flow of fluid gases in and out of the main chamber as relevant to the operation of the other external combustion chamber, namely that given numeral 13.

The top row of vignettes in FIG. 5, namely those labeled V-8 and V-1 deal with the primary or first revolution of the four revolutions constituting a single cycle of operation for the illustrated preferred engine. And that first or primary revolution in the cycle of revolutions is labeled R-1. Similarly, the remaining three revolutions are labeled R-2, R-3 and R-4. Next to each vignette of FIG. 5 is a circle about the plane or level (that is W, X, Y, or Z as marked in FIG. 2) for the sectional view illustrated by the vignette. Again it is emphasized that the L-shaped valve conduits illustrated in FIG. 5 are given the same numbers assigned to them in FIG. 1. And again one is to be reminded that the rotation of the valve shafts 16 and 17 is counterclockwise as viewed at the sectional levels in FIG. 5.

In the first revolution or primary revolution R-1 of an engine cycle, an intake of combustion supporting fluid occurs. Vignette V-1 at the W level shows the intake of outside air through housing intake port 51 and then through the L valve conduit 43 and the intake port 31 into the main chamber behind the piston vane.

Also shown in V-1 is the position of the L-shaped valve conduit 47 in valve shaft 16. While valve conduit 47 in shaft 16 is in a position communicating with the exhaust or outlet port 32 from the main chamber, nothing passes through valve conduit 47 in the orientation it has in V-1 simply because the other leg of the L-shape conduit 47 is blocked by housing body material which prevents communication with combustion chamber 12. But a three-fourth counterclockwise revolution of the L conduit 47—i.e., to the position illustrated in V-7—places the main chamber outlet port 32 in communication with one leg of the L conduit 47, with the other leg of the L-shaped valve conduit 47 in communication with the exhaust port 52 through the housing to the atmosphere.

Continuing with the discussion of the first or primary revolution R-1, reference is now made to the vignette V-8 which shows the positions of the L-shaped valve conduits 45 and 49 in that first or primary revolution.

Valve conduits 45 and 49 through the valve shafts 17 and 16, respectively, deal with operations pertinent to the combustion chamber 13. Observe for present purposes that the body of the housing prevents any inflow of fluid gases through L-conduit 45 at the orientation of conduit 45 illustrated in vignette V-8. Thus, in this first or primary revolution of the engine cycle, nothing passes through the valve conduit 45 inasmuch as it is in a closed position. On the other hand, in vignette V-8, valve conduit 49 in valve shaft 16 is in a position which may be characterized as the "open" position, allowing exhaust of fluid therethrough from the main chamber exhaust port 59 and out the housing exhaust port 60. The orientation of L-conduit 49 forms therefore a complete passage for the exit of exhaust products from the main chamber; and indeed, in the primary revolution R-1, the burned products originally ignited in the external combustion chamber 13 are exhausted from the main chamber ahead of the piston vane at the same time that combustion supporting fluid to be later compressed into the external combustion chamber 12 is undergoing intake into the main chamber as illustrated in vignette V-1.

In the next or secondary revolution R-2, the L-shaped valve conduits 44 and 48, which are at the X level, are in the orientation illustrated in vignette V-3. In this revolution R-2, the combustion supporting fluid drawn into the main chamber as illustrated at V-1 is forced or pushed by the piston vane through the port 53, L-conduit 48, and port 54 into the combustion chamber 12. The L-shaped valve conduit 44, however, is at an orientation in this revolution which blocks the passage formed by ports 55 and 56. Thus valve 44 at the X level is closed in this revolution.

Further, in the secondary or second revolution R-2, as illustrated in vignette V-2, combustion supporting fluid is again being drawn into the main chamber; this time for the operation of the combustion chamber 13. The intake passage for this is at the Y level, and is the intake passage formed by the housing port 58, the L conduit 45, and the main chamber intake port 57. Also shown in V-2 is the orientation for the L conduit 49, namely an orientation placing that valve conduit in a closed position preventing exhaust movement through the passage formed by the ports 59 and 60.

In the tertiary revolution R-3, at the X level of vignette V-5, an expansion flow passage is formed from combustion chamber 12 to the main chamber. This expansion flow passage is formed by ports 55 and 56 and the L-shaped valve conduit 44 in the orientation illustrated at V-5. This then allows burning fluid to flow from the combustion chamber 12 into the main chamber behind the piston vane. The pressure of that expanding burning fluid against the piston vane forces it forward in the clockwise direction previously mentioned.

Also in the revolution R-3, as shown in the vignette V-4 at the Z level, combustion supporting fluid ahead of the piston vane drawn into the main chamber as illustrated in the vignette V-2 is forced through the passage formed by ports 61 and 62 with connecting valve conduit 50 into the external combustion chamber 13. Note that the passage formed by ports 63 and 64 with interposed L valve conduit 46 is blocked or closed as illustrated in V-4 in this tertiary revolution R-3.

In the last or quaternary revolution of the cycle consisting of four revolutions, the vignette V-7 at the W level shows the L-shaped valve conduit 47 rotated into a communicating condition to form a complete exhaust passage through ports 32 and 52 for burned fluid to exit the main chamber. The burned fluid thus exhausted in the illustration of vignette V-7 is that which entered behind the piston vane in the vignette V-5 and came from the external combustion chamber 12. The intake L-conduit 43 at this revolution is oriented to a closed condition to prevent passage through the ports 51 and 31 of the intake passage.

Finally, in the fourth revolution R-4, as illustrated in vignette V-6 at the Z level, the L-shaped valve conduit 46 is in an orientation which opens the expansion flow passage through port 63 and port 64 into the main chamber. Also shown in vignette V-6 at the Z level is the orientation of the L-shaped valve conduit 50 in the quaternary revolution. It effectively closes the passage formed by the ports 61 and 62 into the external combustion chamber 13. Thus in vignette V-6, in the quaternary revolution R-4, burning fluid from the combustion chamber 13 expands into the main chamber behind the piston vane to push the piston vane in a clockwise direction just as the expanding burning fluid from the combustion chamber 12 expanded into the main chamber as illustrated at vignette V-5 in the tertiary revolution R-3. Thereafter the cycle of four revolutions is repeated; and it will be remembered that in discussing the primary revolution R-1, vignette V-8 was noted to have its valve conduits in an orientation whereby burned fluid or burned products of combustion were exhausted from the main chamber ahead of the piston vane through the passage formed by ports 59 and 60 having valve conduit 49 so oriented as to form an open passageway for that exhaust passage of the burned fluid (i.e., the burned fluid which entered the main chamber from combustion chamber 13 as illustrated in vignette V-6).

In summary, the vignettes of odd number illustrate the L-shaped valve conduit positions at each of the four revolutions making up a complete cycle for dealing with fluid gases pertinent to the operation of the external combustion chamber 12, whereas the vignettes of even number are applicable to the four revolutions pertinent to the operation of the external combustion chamber 13. But because fluid gases ahead of as well as behind the piston vane in each revolution of the rotor play a functional part in the operation of the engine, a total of four revolutions effectively may constitute a single complete cycle for the operation for the engine, as illustrated.

Further to be observed from the chart of FIG. 5 is the fact that the first two revolutions, the primary and secondary revolutions, are intake revolutions as illustrated by vignettes V-1 and V-2. The tertiary and quaternary revolutions, illustrated by vignettes V-5 and V-6 are both power revolutions, that is revolutions where the piston vane of the rotor is being pushed by expanding burning fluid introduced from an external combustion chamber. Similarly, it will be noted that exhaust of burned fluid occurs on two adjacent revolutions, namely revolutions R-4 and R-1 illustrated by vignettes V-7 and V-8, whereas the compression of the combustion supporting fluid into an external combustion chamber occurs on two adjacent revolutions, namely the secondary and tertiary revolutions illustrated by vignettes V-3 and V-4.

If desired, the intake of combustion supporting fluid through the intake passages illustrated in vignettes V-1 and V-2 may be from a carburetor and thus incorporate both the fuel and the air or oxygen for supporting combustion of that fuel. Alternatively, if desired, only air or oxygen may be drawn through the intake passages illustrated in vignettes V-1 and V-2; and if that approach is taken, it is appropriate to employ a fuel injection means for introducing fuel into the external combustion chambers 12 and 13. As illustrated in FIGS. 1 and 2, any appropriate fuel injection means 65 and 66 may be employed for the purpose of injecting fuel into the external combustion chambers. It should be recognized that the illustrated engine may be operated on a diesel principle. However, ignition within the external combustion chambers may be initiated by any suitable means such as spark plugs 67 and 68.

Timing of fuel injection as well as ignition is appropriately accomplished by employing a cam 69 or cams on the valve shaft 16 at an appropriate location for initiating fuel injection followed by ignition of the mixture within the external combustion chambers while the piston vane passes through the single fixed axially-parallel strip area 25 on the interior cylindrical surface of the main chamber. For example, referring particularly to FIG. 3, fuel injection preferably occurs at the moment the piston vane 21 passes the axially-parallel alignment of main chamber ports (illustrated at 32) governed by the valve shaft 16, with ignition triggered momentarily thereafter or as the piston vane moves toward or across the alignment of main chamber ports (illustrated at 31) governed by valve shaft 17.

It is important to recognize that the intake passages as well as the expansion flow passages governed by the valve shaft 17 all port into the main chamber at a location proximate to the fixed strip area but on the side of that fixed strip area reached by the piston vane momentarily after moving through the fixed strip area. Similarly, the compression flow passages and exhaust passages all port from the main chamber at a location proximate to the fixed strip area but on the side thereof reached by the piston vane momentarily before moving through the fixed strip area.

Steam enhancement of the power revolutions (e.g., R-3 and R-4 of FIG. 5) is easily incorporated as a feature of the engine. In those revolutions, burning fluid (e.g., fuel and air) from an external combustion chamber continues to burn and expand as it pushes the piston vane in a clockwise direction; but at about the midpoint of the revolution (e.g., when the piston vane is in the position illustrated in FIG. 4), burning is nearly complete. In any event, at about that midpoint, maximum force on the piston vane to push it clockwise is realized from the burning gases. Water injected into the external combustion chambers through water injection means 70 and 71 (FIGS. 1 and 2) at about the midpoint of the burning revolution will essentially instantaneously be converted into superheated steam since the temperature in the combustion chambers can easily approach or even exceed approximately 1000° C. The expanding superheated steam exhibits a high pressure and passes from the combustion chamber almost immediately into the main chamber behind the piston vane, with a thrust behind that vane which adds considerably to the force moving the rotor clockwise, thus adding to the power of rotation of the drive shaft. Cam means on a valve shaft, as aforediscussed for timed fuel injection, may be employed for timing the water injection.

In the illustrated embodiment, the valve means or valve shafts 16 and 17 are disposed in the plural passages having the ports aforediscussed, and the L-shaped conduits in the shafts effectively are the valve members that selectively open and close communication of the several passages so as to effect the cycle of engine operation.

It will readily be evident that by employing a single external combustion chamber such as combustion chamber 12, and by employing valve shafts which undergo one complete rotation in three revolutions of the rotor, with appropriate timed gearing to accomplish that effect, the engine may be operated on a cycle of three revolutions, namely that illustrated in FIG. 5 at vignettes V-1, V-3, and V-5, with the function of exhaust as illustrated in V-7 taking place in the primary revolution simultaneously with the intake of combustion supporting gases as illustrated in vignette V-1. Thus the functions of the quaternary revolution illustrated in FIG. 5 for combustion chamber 12 may be incorporated into the primary revolution, thereby in this instance making the quaternary and primary revolutions one and the same.

Further, if desired, the valving and porting at the Y level may be combined with that at the W level (using T-shaped valve conduits instead of L-shaped ones) for an engine having two external combustion chambers, without sacrifice of reliability of the four revolution cycle in a manner as aforediscussed. Thus, three valve conduit positions along a shaft may be employed with equal reliability of operation for an engine of two combustion chambers and four revolution cycles.

Note that the revolutions of the rotor (and piston vane) in a quaternary or four revolution cycle for one external combustion chamber is but one revolution ahead (or behind) the four revolutions of the rotor in the cycle applicable for the other combustion chamber.

Recognize also that the circumferential spacing of the axially parallel seals (i.e., the T-bars) is no greater than the arced width of the single axially-parallel strip area on the interior cylindrical surface of the main chamber.

Stated another way, the circumferential spacing of the radially-projecting (and transversely oriented) sealing members of the rotor is no greater than the width of the circumferentially oriented arc (or segment) of the single fixed strip area that extends transversely across the circumferential surface of the main chamber. In all illustrated preferred embodiments of the invention, these radially-projecting sealing members of the rotor comprise transversely-extending elongate members having at least a portion thereof shaped into a T configuration. The rotor includes T-shaped mating recesses within which the cross of the T configuration of the elongate members is lodged. The circumferential width (i.e., the circumferentially oriented arc or segment width) of the single transverse strip area on the circumferential interior surface of the main chamber is always greater than the circumferential spacing of the transversely-extending elongate sealing members.

Figure 6:
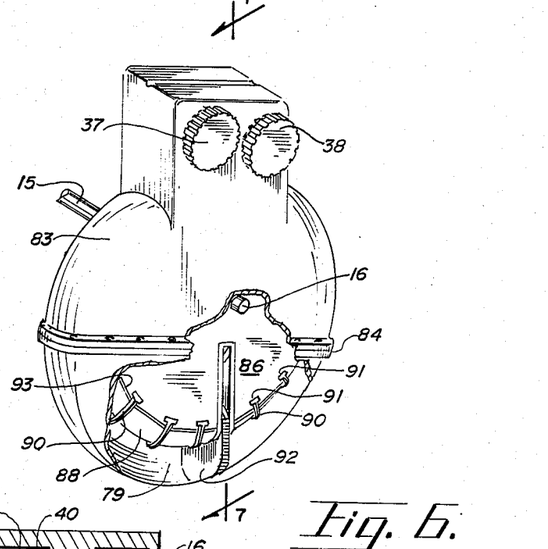
FIG. 6 is a schematic perspective view of the main features for a different embodiment for the engine, particularly illustrating the feature of a transverse curvature for the circumferential surfaces of the main chamber and rotor, with parts broken away.
Figure 7:
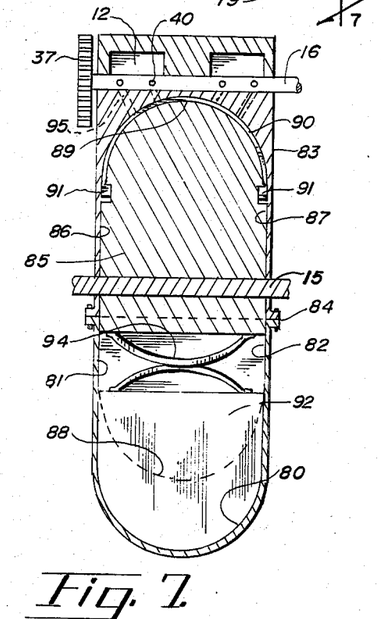
FIG. 7 is a schematic sectional view, partially broken away, taken on line 7—7 of FIG. 6.

Refer now particularly to FIGS. 6 and 7 where a variation in the circumferential wall surfaces for the main chamber and rotor of an engine according to the invention are illustrated. An engine according to FIGS. 6 and 7 suitably may have all features as described for the engine of FIGS. 1 through 5 inclusive, except for the special contour of the main chamber and the rotor and its elements as illustrated in FIGS. 6 and 7.

The main chamber 79 in FIGS. 6 and 7 has an internal circumferential surface 80 which is transversely uniformly curved, that is, arced from one side surface 81 of the main chamber to the other side surface 82 of the main chamber. The engine has a housing 83 within which the main chamber 79 is located. The chamber surfaces are defined by interior surfaces of walls of the housing. The housing may consist of upper and lower parts appropriately flanged, gasketed, and united at a transverse plane 84.

The circumferential surface of the main chamber is in fact an endless circumferential surface bridging between the opposing or opposite side surfaces. (The circumferential surface may be a cylinder as in the embodiment previously discussed, or it may be a transversely curved surface as here discussed.) This endless circumferential surface defines the axis of the main chamber; and thus the circumferential surface is located concentrically or coaxially about the axis of the main chamber. All planes perpendicular to the axis of the main chamber will therefore intersect the interior circumferential surface of the main chamber in a manner forming an endless line which in fact is a circle.

Some additional features are noteworthy for the main chamber illustrated in FIGS. 6 and 7. The arc of the transverse curvature for the circumferential surface 80 is such that it merges smoothly with the side surfaces 81 and 82 of the main chamber and thus does not form a line of clear demarcation or intersection with the side surfaces. Preferably, the arc of curvature for the endless circumferential surface bridging between the side surfaces is such as to have a radius essentially equal to one half the distance of spacing between the side surfaces of that main chamber. Such is the preferred structure; but it should be recognized that a parabolic type arc of transverse curvature or an arc of transverse curvature of reduced radius at its medial portion may be employed with substantial retention of the benefits achieved when employing the ideal arc of curvature having a radius of one half the spacing distance between the side plates or surfaces of the main chamber. Especially significant is that this embodiment illustrates avoidance of a right angle intersection between the interior surface of a cylinder and the interior surfaces of side walls of a main chamber.

As in the case of the embodiment of the other Figures, the rotor 85 in the embodiment of FIGS. 6 and 7 has substantially flat opposing side walls or surfaces 86 and 87 which lie next to the substantially flat interior surfaces of the side walls of the main chamber. But the rotor's endless circumferential surface 88 bridging between the flat side walls 86 and 87 of the rotor is transversely arced or contoured to fit in the transverse arc or contour of the circumferential surface 80 of the main chamber. The transverse contour of the circumferential surface 88 of the rotor is such that it substantially mates with the arc of transverse contour of the main chamber without a binding or locking effect; and this characteristic is particularly to be stressed for the neutral position 89 where the single fixed transverse strip across the circumferential surface of the main chamber is located. (That strip area and its importance are matters illustrated in FIGS. 3 and 4 for the embodiment earlier discussed.)

As in the case of the cylindrical embodiment earlier discussed, a plurality of transversely-elongate radially projecting sealing members 90, circumferentially spaced as described for the cylindrical embodiment above, is located about the rotor of the embodiment of FIGS. 6 and 7. These radially projecting sealing members 90 extend transversely or in the axially parallel direction from one side to the other side of the rotor. Here, too, these members suitably incorporate or have as a part thereof a T configuration 91; but in this instance, the T configuration is at each end of each arcuate or semi-circular (or semi-cylindrical) elongate sealing member 90. A T-shaped mating recess is present in the rotor of this embodiment as well as in that of FIG. 1; and the "horizontal" cross of the T configuration for these elongated semi-circular sealing members is lodged in the T-shaped recesses of the sides of the rotor. These sealing members which incorporate or have as a part thereof a T configuration are for the purpose of providing the seal along the transversely extending single fixed strip area on the interior circumferential surface of the main chamber, as particularly discussed in connection with FIGS. 3 and 4. The transverse arcing and intermating configurations between the main chamber and rotor as illustrated in FIGS. 6 and 7 further enhance reliable sealing at that neutral zone.

In effect, in the embodiment of FIGS. 6 and 7, sealing is accomplished at the single fixed strip area in a manner comparable to the sealing accomplished by piston rings in the conventional reciprocating piston cylinder of internal combustion engines. Thus it is that the most preferred structure for the embodiment illustrated in FIGS. 6 and 7 is that of a semi-circular transverse arc of curvature for the interior circumferential surface of the main chamber as well as the outer circumferential surface of the rotor and the elements carried by it. That preferred curvature for the housing is such that a plane common to the axis of the housing and rotating about that axis would always form a semi-circle of intersection with the endless circumferential inside surface of the housing. Likewise, a plane common to the axis of the rotor and rotated thereabout would always form a semi-circle of intersection with the outer essentially endless circumferential surface of the rotor (that surface being endless but for the locations of the transverse seal members and piston vane, which themselves at radially inward locations complete the endless circumferential surface of the rotor).

Of course, the radially outermost or distal edge of the piston vane 92 employed in the embodiment of FIGS. 6 and 7 also is contoured (i.e., arced in a direction transverse to its direction of movement). Its arc of curvature should be identical (or nearly so) to that for the transverse arcing of the rotor. If desired, the most radially outer or distal edge of the piston 92 may be provided with a semi-circular elongated sealing member by employing the same principles for sealing at that edge as discussed hereinabove for the rotor sealing (using semi-circular "rings" and T configuration ends).

In all other respects, the specially contoured housing and rotor assembly illustrated in FIG. 6 and 7 may be employed with elements of apparatus and relationships as discussed and illustrated in FIGS. 1 through 5 inclusive.

Thus sealing means or side bar seals in the nature of bar members 93 (compare with 19 in FIG. 1) may be incorporated in recesses along the sides of the rotor between the end portions of the semi-circular "ring" type seals for the purpose of effecting a sealed condition between the sides of the rotor and the interior side surfaces of the main chamber. The piston vane 92 may be mounted within a U-seal structure lodged in the body of the rotor as discussed for the cylindrical embodiment above. The combustion chamber concepts, including two combustion chambers, and all the discussion hereinabove dealing with valves, passages, porting, and timing are equally applicable for the structure illustrated in FIGS. 6 and 7; and a few such parts are given numbers in FIGS. 6 and 7 identical to the numbering for them in other Figures. (For further clarity, the double leaf spring is labeled 94 and functions as before to press the piston vane radially outwardly; and one of the passages is labeled 95 and represents the passage at level W in FIG. 2.)

Thus has been described embodiments for new engines wherein both the rotor and the main chamber are truly round (which simplifies seal construction and manufacture), wherein fuel burning begins in an external chamber before release into the main chamber and burning continues throughout most of the entire revolution of the rotor (which gives a long burning time with excellent fuel combustion and less exhaust pollution), wherein the engine design is extremely simple and has no complicated parts (which permits rapid and easy manufacture and assembly), wherein all parts of the engine move continuously in the same direction (which gives very smooth operation), wherein the engine is easy to balance (and thus should tolerate very high revolutions per minute), wherein the radial length from the center of the drive shaft to the distal end of the piston is relatively long (which affords a very powerful torque leverage on the drive shaft), wherein the major moving parts wear on the same surfaces continuously (which enhances uniformity of wear and minimizes the effect of wear), wherein the fundamental features of design permit versatile operation (whether diesel, carburetion, fuel-oil-air, fuel-air, or fuel-oil injection), and wherein the long power stroke makes the engine readily adaptable for the use of engine heat to create steam enhancement of that stroke.

While the invention has been described with particular reference to the preferred embodiments, insubstantial variations as well as equivalents are comprehended. In this respect, the claims appended hereto and made a part of this disclosure should be construed with the understanding that the recitations therein are met by substantial compliance therewith; and they are to be construed as broadly, including equivalents known or hereafter developed, as consistent with their validity.

That which is claimed is:

1. A rotary engine comprising a housing having a main chamber and at least one discrete and smaller combustion chamber spaced apart from said main chamber, said main chamber being defined by opposing side surfaces and by an endless circumferential surface bridging between said side surfaces and defining the axis of said main chamber, the intersection between all planes prependicular to the axis of said main chamber and said endless circumferential surface thereof being a circle, a rotor within aid main chamber with a fixed axis of rotation parallel to but spaced from the axis of said main chamber and with lateral sides of said rotor in juxtaposed relationship to said main chamber side surfaces, a rotatable drive shaft mounted in said housing at the axis of said rotor and rotated by said rotor, plural passage means for communication between said combustion chamber and main chamber and for intake of cumbustion supporting fluid into and exhaust of burned fluid from said main chamber, and valve means disposed in said passage means, wherein said rotor includes (i) a plurality of radially-projecting sealing members in spaced relationship thereabout for maintaining said rotor at all times during rotation thereof in a fluid-sealed condition with respect to said circumferential surface of said main chamber along a single fixed transverse strip area across said circumferential surface, said radially projecting sealing members having end portions thereof at the lateral sides of said rotor, said radially-projecting sealing members being the sole sealing means for maintaining said fluid-sealed condition along said fixed strip area, there being no seal means on the circumferential surface of said main chamber for forming any fluid-sealed condition at said fixed strip area, (ii) piston means consisting of a single radially-oriented axially-parallel piston vane recessible within said rotor and biased during rotation of said rotor to extend radially outward to thereby maintain the radially-outward end thereof at all times in pressing contact relationship with the circumferential surface of said main chamber during rotation of said rotor, said piston vane being moved through said fixed strip area of said main chamber at each revolution of said rotor, and (iii) lateral sealing members for effecting a fluid-sealed condition between said rotor lateral sides and said main chamber side surfaces, said lateral sealing members being carried on lateral sides of said rotor between and portions of said radially-projecting sealing members, and said passage means are entirely within said housing, with the porting thereof to and from said main chamber exclusively at locations adjacent said fixed strip area, said porting comprising two ports on each side of said fixed strip area, with all ports on each side of said fixed strip area in an alignment transverse to the circumferential surfaces of said main chamber.

2. The engine of claim 1 wherein said plural passage means comprises an intake passage for said intake of combustion-supporting fluid into said main character, an expansion flow passage for conducting burning fluid from said combustion chamber to said main chamber, said intake passage and expansion flow passage both porting into said main chamber on the side of said fixed strip area reached by said piston vane momentarily after moving through said fixed strip area, a compression flow passage for conducting combustion supporting fluid from said main chamber into said combustion chamber, and an exhaust passage for exit of burned fluid from said main chamber, said compression flow passage and exhaust passage both porting from said main chamber on the side of said fixed strip area reached by said piston vane momentarily before moving through said fixed strip area.

3. The engine of claim 2 wherein said valve means disposed in said plural passage means comprises two rotatable shaft valve members for selectively opening and closing communication of said passages of said passage means with said main chamber to effect a cycle of operation of said engine wherein combustion supporting fluid is drawn through said intake passage into said main chamber behind said piston vane on a primary revolution of said rotor, combustion supporting fluid is pushed from said main chamber in front of said piston through said compression flow passage into said combustion chamber on the secondary revolution of said rotor, burning fluid from said combustion chamber is passed through said expansion flow passage into said main chamber behind said piston vane on the tertiary revolution of said rotor, and burned fluid in said main chamber is then pushed therefrom in front of said piston vane out said exhaust passage in the quaternary revolution of said rotor in said cycle.

4. The engine of claim 3 further characterized by having a single said combustion chamber in said housing, and wherein said valve means effects a cycle of operation of said engine in which said primary and quaternary revolution are one and the same.

5. The engine of claim 3 further characterized by having a second combustion chamber in said housing in a relationship spaced from said one combustion chamber as well as from said main chamber, and by having a second said expansion flow passage and a second said compression flow passage.

6. The engine of claim 3 further characterized by having a second combustion chamber in said housing in a relationship spaced from said one combustion chamber and from said main chamber, and by having a second said expansion flow passage and a second said compression flow passage, and wherein said valve means effectively causes the revolutions of said rotor in a quaternary cycle applicable for said one combustion chamber to be one revolution ahead of the revolutions of said rotor in the quaternary cycle applicable for the other said combustion chamber.

7. The engine of claim 1 wherein said circumferential surface of said main chamber is cylindrical.

8. The engine of claim 7 wherein said rotor is cylindrical at its circumferential peripheral portions.

9. The engine of claim 1 wherein said circumferential surface of said main chamber is uniformly curved in the direction transverse to the circumference thereof.

10. The engine of claim 1 wherein said circumferential surface of said main chamber is uniformly curved in directions transverse to the circumference thereof, with the curvature merging smoothly with the side surfaces of said main chamber.

11. The engine of claim 9 wherein said rotor at its circumferential peripheral portions is curved in the direction transverse to said portions and wherein said transverse curvature of said rotor is comparable to the transverse curvature of the circumferential surface of said main chamber.

12. The engine of claim 1 wherein said radially projecting sealing members of said rotor comprise elongated members extending transversely to the circumferential peripheral portions of said rotor and having at least a portion thereof shaped into a T configuration, and wherein said rotor includes T-shaped mating recesses within which the cross of said T configurations of said elongated members is lodged.

13. The engine of claim 1 wherein said lateral sealing members of said rotor are at circumferentially outward locations on the lateral sides of said rotor.

14. The engine of claim 3 including gear means driven by said rotor for effecting a slower rate of rotation for said valve members than said rotor.

15. The engine of claim 1 additionally comprising means for injecting fluid fuel into said combustion chamber.

16. The engine of claim 1 additionally comprising means for initiating the ignition of a combustible mixture in said combustion chamber.

* * * * *

UNITED STATES PATENT AND TRADEMARK OFFICE
CERTIFICATE OF CORRECTION

PATENT NO. : 4,548,171
DATED : Oct. 22, 1985
INVENTOR(S) : Theodore G. Larson

It is certified that error appears in the above—identified patent and that said Letters Patent is hereby corrected as shown below:

In the Claims:

Col. 13, line 52, "aid" should read --said--.

Col. 14, line 32, "surfaces" should read --surface--.

Signed and Sealed this

Sixth Day of May 1986

[SEAL]

Attest:

DONALD J. QUIGG

Attesting Officer

Commissioner of Patents and Trademarks